US012054977B2

(12) United States Patent
Almes et al.

(10) Patent No.: US 12,054,977 B2
(45) Date of Patent: Aug. 6, 2024

(54) WINDOW REGULATOR ASSEMBLY, AND DRIVER FOR A WINDOWPANE

(71) Applicant: Brose Fahrzeugteile SE & Co. Kommanditgesellschaft, Bamberg, Bamberg (DE)

(72) Inventors: Bert Almes, Merseburg (DE); Jörg Müller, Ahorn (DE); Udo Taubmann, Bad Rodach-Sülzfeld (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 17/903,215

(22) Filed: Sep. 6, 2022

(65) Prior Publication Data

US 2023/0075849 A1 Mar. 9, 2023

(30) Foreign Application Priority Data

Sep. 3, 2021 (DE) ..................... 10 2021 209 737.5

(51) Int. Cl.

*E05D 15/16* (2006.01)
*E05F 11/38* (2006.01)
*E05F 15/689* (2015.01)

(52) U.S. Cl.

CPC .......... *E05F 11/385* (2013.01); *E05F 15/689* (2015.01); *E05D 15/165* (2013.01);
(Continued)

(58) Field of Classification Search

CPC . E05F 11/385; E05F 15/689; E05F 2011/387; E05D 15/165; E05Y 2201/64;
(Continued)

(56) References Cited

U.S. PATENT DOCUMENTS 4,949,509 A * 8/1990 Gold ........................ B60J 10/75 49/502
6,119,403 A * 9/2000 Klippert ................ E05F 11/525 49/506
6,453,617 B1 * 9/2002 Klippert ................ E05F 11/385 49/375
8,096,080 B2 * 1/2012 Pavlovic ............... E05F 11/488 49/374
(Continued)

FOREIGN PATENT DOCUMENTS

DE 202004018460 U1 4/2006
DE 102012223825 A1 7/2013
DE 102019107512 A1 10/2020

*Primary Examiner* — Jerry E Redman
(74) *Attorney, Agent, or Firm* — Laurence A. Greenberg; Werner H. Stemer; Ralph E. Locher

(57) ABSTRACT

A window regulator assembly for an adjustable windowpane of a motor vehicle has a driver with two driver limbs which are connected via a connecting limb and between which a receiving gap for the windowpane is formed. A first driver limb is being configured for guiding the driver along an adjusting path. It being possible for the second driver limb to be moved elastically with respect to the first driver limb, and the second driver limb has a latching element which protrudes into the receiving gap, engages into a pane-side latching opening during insertion of the windowpane into the receiving gap of the driver, and can be moved out of the pane-side latching opening for dismantling of the window-pane. The driver has a locking element for limiting a pivoting path of the second driver limb during its movement with respect to the first driver limb.

12 Claims, 7 Drawing Sheets

(52) U.S. Cl.
CPC ..... *E05F 2011/387* (2013.01); *E05Y 2201/64* (2013.01); *E05Y 2201/684* (2013.01); *E05Y 2600/46* (2013.01); *E05Y 2600/502* (2013.01); *E05Y 2600/626* (2013.01); *E05Y 2800/344* (2013.01); *E05Y 2900/55* (2013.01)

(58) Field of Classification Search
CPC ........... E05Y 2201/684; E05Y 2600/46; E05Y 2600/502; E05Y 2600/626; E05Y 2800/344; E05Y 2900/55
USPC .................................................... 49/374, 375
See application file for complete search history.

(56) References Cited

U.S. PATENT DOCUMENTS

| | | | | |
|---|---|---|---|---|
| 8,739,467 | B2 * | 6/2014 | Reno | E05F 11/385<br>49/374 |
| 10,246,926 | B2 * | 4/2019 | Lagenstroeer | B60J 1/004 |
| 11,118,390 | B2 * | 9/2021 | Mueller | E05F 11/483 |
| 11,377,892 | B2 * | 7/2022 | Hampel | E05F 11/385 |
| 11,577,583 | B2 * | 2/2023 | Barr | B60J 1/17 |
| 2004/0088924 | A1 * | 5/2004 | Moser | E05F 11/385<br>49/375 |
| 2007/0022665 | A1 * | 2/2007 | Bigourden | E05F 11/385<br>49/375 |
| 2013/0152476 | A1 * | 6/2013 | Reno | E05F 11/385<br>16/96 R |
| 2017/0241181 | A1 * | 8/2017 | Reinke | E05F 11/385 |
| 2023/0075849 | A1 * | 3/2023 | Almes | E05F 15/689 |

* cited by examiner

WINDOW REGULATOR ASSEMBLY, AND DRIVER FOR A WINDOWPANE

CROSS-REFERENCE TO RELATED APPLICATION

This application claims the priority, under 35 U.S.C. § 119, of German Patent Application DE 10 2021 209 737.5, filed Sep. 3, 2021; the prior application is herewith incorporated by reference in its entirety.

FIELD AND BACKGROUND OF THE INVENTION

The invention relates to a window regulator assembly for an adjustable windowpane of a motor vehicle, having a driver, which is guided along an adjusting path, with two driver limbs which are connected via a connecting limb and between which a receiving gap for the windowpane is formed. Furthermore, the invention relates to a driver for a window regulator of this type of a motor vehicle.

Movable vehicle windowpanes are usually moved between a closed position and an open position by way of actuating apparatuses as vehicle window regulators which are operated electrically or by electric motor. A window regulator of this type as a rule contains an electric motor adjusting drive and an actuating mechanism, connecting (that means coupling in terms of power transmission) the adjusting drive to the windowpane, of a window regulator assembly which are assigned to a motor vehicle door or a motor vehicle body.

In order to guide the windowpane, it is provided, in the case of a vehicle door, with at least one (pane) driver as pane guide element, for example on a lower window edge. Here, the driver can be guided along an adjusting path oriented in the direction of the vehicle height (Z-direction) such that it can be displaced in at least one guide rail which acts as an adjusting or guide track, on a pull cable or along or on a (for example, rail-like) contact or guide contour, in particular a carrier plate of a door module, of the window regulator assembly. The following comments in conjunction with the term “guide rail” are intended to also apply to the pull cable guide and/or to the contact or guide contour, it being essential that the driver is guided along the predefined adjusting path, for example is guided by rail, carrier contour or cable.

A driver of the abovementioned type as a rule has a rail slider which is manufactured from plastic. The rail slider typically has a main body with a guide region which, in the mounted state, engages around the possibly provided guide rail, for example as a rail wrap-around means. In this case, the guide rail is seated in the guide region, the rail slider or the main body and the guide rail being in engagement with one another. The rail slider is mounted such that it can be displaced along the guide rail in engagement, with the result that the windowpane is guided in a linear manner between the closed position and the open position. The main body of the rail slider is coupled, for example, to a pane holder as (pane) driver for mechanical attachment to the windowpane.

In order to connect the driver to the windowpane, the driver has, for example, two driver or clamping limbs which are configured and provided to receive the windowpane to be adjusted between them, for example in a clamping manner. To this end, the driver limbs can be moved relative to one another. The windowpane is received with its lower edge between the driver limbs of the driver and is subsequently clamped in or braced between the two driver limbs as a result of the latter approaching one another. In order to brace the two driver limbs, a screw connection with a screw or with a threaded bolt as clamping element can be used, via which one of the two driver limbs is brought closer to the other driver limb.

The driver can also be configured for screwless latching (clipping in) of the windowpane. To this end, it is known from published, non-prosecuted German patent application DE 10 2012 223 825 A1, for example, for the connection of the driver to the windowpane to be performed without tools via an elastically movable latching portion with a latching lug. Here, the latching portion can be moved elastically counter to a restoring force for the connection of the windowpane to the driver, with the result that the latching lug of the latching portion is moved into engagement with a recess or a through opening of the windowpane (pane-side latching opening) as a consequence of the restoring force, and the connection of the windowpane to the driver is established in this way.

In the case of dismantling (due to repair, for example) of the windowpane, a tool is usually guided against the latching lug, for example via an opening in the door interior part of a vehicle door. The elastically movable driver limb is pivoted by way of the dismantling tool which comes into contact with the latching lug, it being possible for the tool to reach through the pane-side latching opening. The windowpane can subsequently be pulled out of the driver, the driver-side latching lug bearing against the windowpane, in particular in the region of the opening edge of the pane-side latching opening, as soon as the pane-side latching opening has passed the latching lug. In this state, the dismantling tool can first of all be pulled out of the latching opening and the windowpane can subsequently be released from the driver.

It is a problem in the case of a dismantling operation of this type that the elastically movable driver limb (also called a bending limb of the driver in the following text) can be excessively loaded, in particular by way of the tool, and the bending limb can break off in the process. This would lead to undesired damage or to destruction of the driver.

SUMMARY OF THE INVENTION

The invention is based on the object of specifying a window regulator assembly with a driver which can be reliably connected to and released from a windowpane of a motor vehicle. In particular, damage of the driver is to be avoided in the case of dismantling of the windowpane. Furthermore, a suitable driver for a window regulator assembly of this type (a window regulator) is to be specified. The driver is to be provided and configured, in particular, for establishing a secured (preferably without tools) latching connection to the windowpane.

With regard to the window regulator assembly, the object is achieved according to the invention by way of the features of the independent window regulator assembly claim and, with regard to the driver, by way of the features of the independent driver claim. Advantageous refinements and developments are the subject matter of the subclaims.

The window regulator assembly is provided and configured to adjust a windowpane, in particular of a side door of a motor vehicle, along an adjusting path, and to move it between a closed position and an open position. The window regulator assembly has a (pane) driver which has two driver limbs which are connected via a connecting limb and between which a receiving gap (pane gap) is formed for the windowpane. To this end, the driver which is guided, for example, on a guide rail is approximately U-shaped in longitudinal section or in a side view of the receiving gap, the two U-limbs forming the driver limbs, and their connection on the gap bottom forming the connecting limb.

A first driver limb which is also called a fixed (driver) limb in the following text is preferably provided for guiding the driver along the adjusting path. In particular, the first driver limb is configured for securing and guiding on a guide rail. In this embodiment with a rail slider function, the first driver limb preferably has a rail wrap-around means which is, in particular, L-shaped and engages around the guide rail or a rail contour of a guide rail which is cup-shaped, for example.

The second driver limb which is also called a movable driver limb or a bending limb in the following text can be moved or deformed in a (resiliently) flexible manner with respect to the first driver limb, and has a latching element (latching lug) which protrudes into the receiving gap, and which engages into a pane-side latching opening, in particular in the form of a hole or a recess in the windowpane, or latches or snaps in a positively locking manner into the latter during insertion of the windowpane into the receiving gap of the driver. The latching element or the second driver limb can be moved out of the pane-side latching opening for dismantling of the windowpane.

The driver has a locking element for limiting a pivoting path of the second driver limb during its movement with respect to the first driver limb. The locking element is preferably arranged behind the latching element in the gap longitudinal direction which is directed with respect to the gap bottom of the receiving gap. The locking element is particularly preferably arranged, in particular molded, in the gap longitudinal direction outside the receiving gap in the region of the connecting limb of the two driver limbs, in particular in a connecting portion of the connecting limb. The locking element is suitably configured as locking or contact contours which are elevated transversely with respect to the gap longitudinal direction. The locking element particularly preferably serves for dismantling limitation. It also expediently serves, however, as bending or moving limitation during insertion and latching of the windowpane into and to the driver.

In one expedient refinement, the connecting limb between the two driver limbs of the driver is of drawn-in configuration in a connecting or functional portion which is adjacent to (adjoins) the gap bottom of the receiving gap and has the locking element for dismantling limitation, with respect to at least the second, movable driver limb, and/or is of tapered configuration transversely with respect to the gap longitudinal direction of the receiving gap which receives the windowpane in the region of a pane lower edge including the latching opening.

The locking element is expediently formed first from a first contact contour which is provided on the first driver limb or in the region of the connecting limb of the two driver limbs or in a connecting portion of the connecting limb. Second, the locking element contains or comprises a second contact contour which is also moved in the case of a movement of the (movable or resiliently flexible) second driver limb with respect to the first driver limb. After passing through the pivoting path, the second contact contour comes into contact with the first contact contour.

The locking element is particularly advantageously formed from hooks which are opposed and/or overlap one another and/or engage into one another. The hooks advantageously have a holding limb and a locking limb which runs at an angle with respect to the former, for example approximately at a right angle. The hooks engage with their locking limb over the locking limb of the respective other hook.

One particularly expedient refinement provides a (second) hook which is connected to the second driver limb, in particular is molded onto the latter, and a (first) hook which is connected to the first driver limb or to the connecting limb or to the connecting portion between the driver limbs, in particular is molded onto the latter. The second hook is suitably arranged at a spacing from the first hook, which spacing decreases with an increasing movement of the second driver limb and the latching element along the pivoting path.

One suitable development provides that the first hook or its locking limb faces the second driver limb, and the second hook or its locking limb faces the first driver limb. It can also be provided that the two hooks, in particular firstly their locking limbs with respect to one another and/or secondly their holding limbs with respect to one another, are arranged at a spacing, in particular at a spacing which corresponds to the pane thickness of the windowpane, with respect to one another in such a way that the second hook, in particular its locking limb, bears against the first hook, in particular its locking limb, after passing through the spacing as a consequence of a movement of the second driver limb which has the latching element with respect to the first driver limb. In other words, the hooks are arranged in such a way that the spacing between the hooks or between their locking limbs decreases with an increasing movement of the second driver limb and the latching element along the pivoting path.

Contours which are parallel to one another and run obliquely can also be provided, the spacing of which corresponds approximately to the pane thickness of the windowpane. Reliable bending limitation of the (movable or resiliently flexible) second driver limb, preferably to approximately the pane thickness of the windowpane, is achieved by means of the locking element.

The latching element is suitably configured in the manner of a latching hook which is, in particular, triangular (triangle-shaped). The latching element preferably has an entry bevel which is inclined with respect to the gap bottom of the receiving gap and/or a locking edge which is level with respect to the gap opening of the receiving gap and is normal (perpendicular) with respect to the plane of the second (movable) driver limb, by way of which locking edge the latching element reaches, preferably completely, through the latching opening of the windowpane in the connection of the latching element to the windowpane.

The driver which is provided and configured for a window regulator or a window regulator assembly of the abovementioned type has a receiving gap between a first driver limb and a second driver limb which can be moved in a (resiliently) flexible manner with respect to the former for a windowpane with a latching opening, and a latching element which is provided on the second driver limb and protrudes into the receiving gap for engagement into the pane-side latching opening, and a locking function which blocks a deflection or movement of the driver limb which has the latching element beyond a permissible amount and/or when a predefined or predefinable pivoting path is reached and/or after a predefined or predefinable spacing between limb-side contours is passed through.

Other features which are considered as characteristic for the invention are set forth in the appended claims.

Although the invention is illustrated and described herein as embodied in a window regulator assembly, and a driver for a windowpane, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and variables which correspond to one another are provided with the same designations in all figures.

Figure 1:
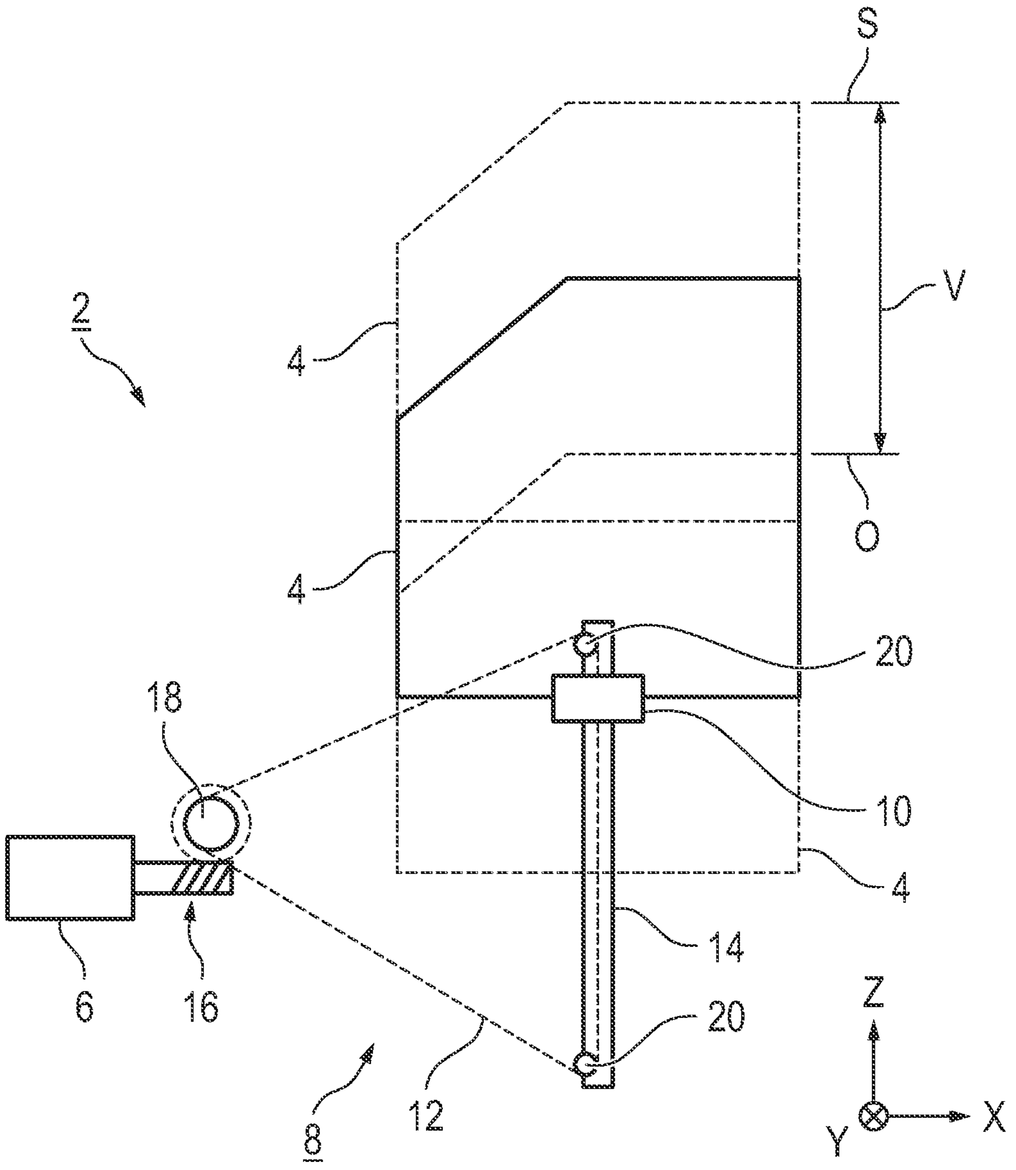
FIG. 1 is a diagrammatic view of a vehicle window regulator with an adjusting drive (actuating motor) and with a window regulator assembly with a (pane) driver which is coupled to a windowpane.

Referring now to the figures of the drawings in detail and first, particularly to FIG. 1 thereof, there is shown a simplified and diagrammatic illustration of an electric or electric motor window regulator assembly 2 as actuating apparatus for a (vehicle) windowpane 4 of a motor vehicle. The window regulator assembly 2 is assigned an adjusting drive 6 which acts on the windowpane 4 by means of an actuating mechanism 8 with a driver 10 of the window regulator assembly 2. In the exemplary embodiment, which is shown, the actuating mechanism 8 has a pull cable 12 and a guide rail 14 of the window regulator assembly, on which guide rail 14 the driver 10 is guided such that it can be moved in a sliding manner along an adjusting path V. A plurality of (for example, two) pull cables 12 and/or, for example, two guide rails with in each case one driver which is guided thereon can also be provided.

The adjusting drive 6 of the window regulator 2 drives a cable drum 18 of the actuating mechanism 8 via a worm or spur gear mechanism 16. The pull cable 12 of the control cable is arranged on the cable drum 18 in such a way that winding up and unwinding of the pull cable 12 takes place in the case of rotations of the cable drum 18 which are brought about by way of the gear mechanism 16. The pull cable 12 of the control cable which is configured, for example, as a Bowden cable is guided over deflection elements or deflection rollers 20, and is coupled to the driver 10 which for its part is guided along on the guide rail 14 and in the process also moves the windowpane 4.

In the case of an actuation of the actuating motor 6, the windowpane 4 is moved along the adjusting path V into its set or desired (pane) position. Here, the windowpane 4 can be moved reversibly between a closed position S which represents the highest possible position and an open position O which represents the lowest possible position. The windowpane 4 is indicated in FIG. 1 in each case using dashed lines in these positions S and O. In contrast, the windowpane 4 is shown in a half-open intermediate position by way of solid lines.

Specifications with regard to the spatial directions are also indicated in the following text in a coordinate system of the motor vehicle (vehicle coordinate system) with regard to the exemplary installation situation in a side door of the motor vehicle. Here, the abscissa axis (X-axis) is oriented along the vehicle longitudinal direction, and the ordinate axis (Y-axis) is oriented along the vehicle transverse direction, and the applicate axis (Z-axis) is oriented along the vehicle height. Here, the axial direction A is oriented parallel to the abscissa axis (X), the radial direction R being oriented substantially parallel to the ordinate axis (Y).

Figure 2:
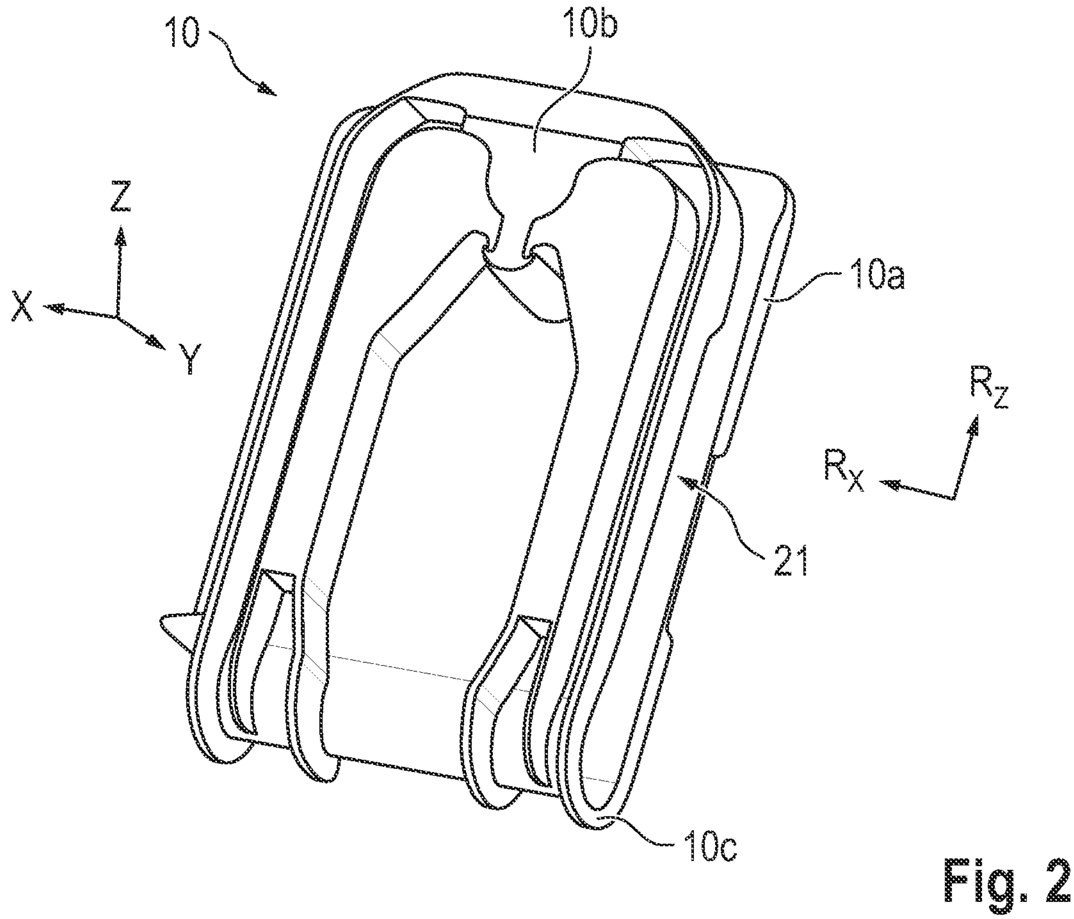
FIG. 2 is a perspective view of the driver with a receiving gap (pane gap) which is formed between driver limbs for the windowpane, with a view of a movable (second) driver limb.
Figure 3:
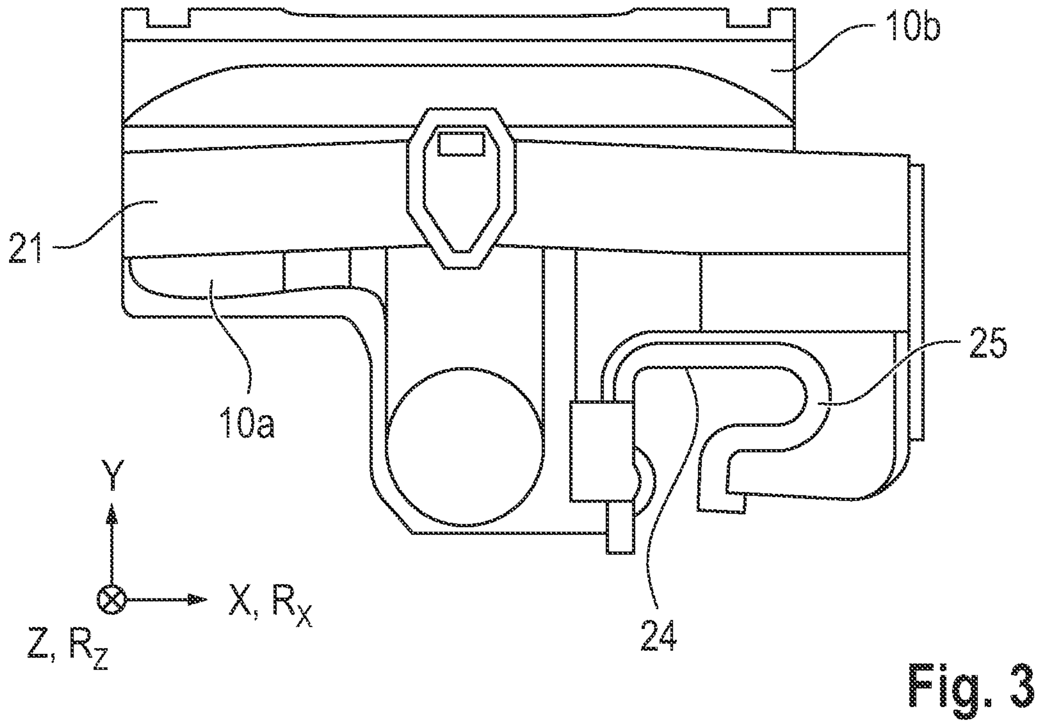
FIG. 3 is an end side view of the driver with a view of a gap opening for introducing the windowpane into the receiving gap, and with a latching element which protrudes into the receiving gap on one of the driver limbs and with a rail wrap-around means on the other driver limb.
Figure 4:
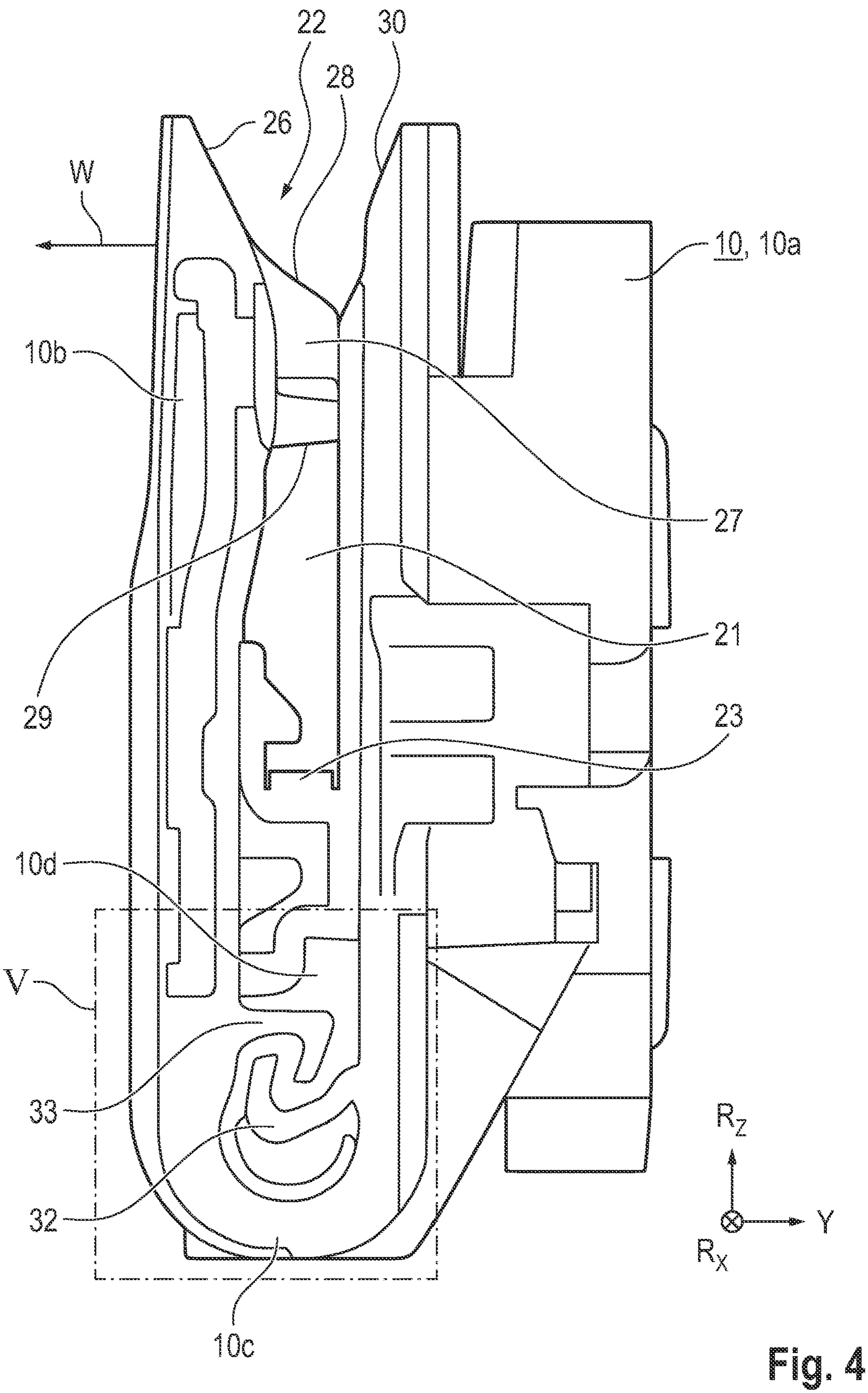
FIG. 4 is a side view of the driver with a view of a locking element, configured as hooks which engage over one another, in a drawn-in (tapered) functional region (functional portion) of a connecting limb or portion between the driver limbs.

FIGS. 2 to 4 show the driver 10 in different views. The orientation of the illustrated driver 10 corresponds to the directions X, Y, Z of the depicted vehicle coordinate system. The driver 10 is of approximately U-shaped or V-shaped configuration and has a first driver limb 10*a* and a second driver limb 10*b*. A receiving or pane gap 21 with a gap opening 22 and with a gap bottom 23 is formed between the driver limbs 10*a* and 10*b*. The driver limbs 10*a* and 10*b* are connected to one another via a connecting limb 10*c*. The connecting limb 10*c* has a connecting or functional portion 10*d* which is drawn in or tapered in the X-direction or gap transverse direction Rx of the receiving gap 21. The connecting or functional portion 10*d* extends as far as the gap bottom 23 of the receiving gap 21.

The first driver limb 10*a* has an approximately L-shaped rail wrap-around means 24 (FIG. 3). The driver 10 is seated by way of the rail wrap-around means 24 on the approximately cup-shaped guide rail 14 and is seated there on a correspondingly shaped rail portion. In the exemplary embodiment, a sliding piece 25 made from a low-friction material, for example of polyoxymethylene (POM), is inserted into the rail wrap-around means 24. In the mounted state of the window regulator assembly 2, the first driver limb 10*a* is guided along the guide rail 14 and is held on the latter. The first driver limb 10*a* is therefore also called a fixed driver limb of the driver 10 in the following text. The first, fixed driver limb 10*a* has an entry bevel 26 (FIG. 4) in the region of the gap opening 22 of the receiving gap 21.

The second driver limb 10*b* can be moved elastically or can be deformed in a resiliently flexible manner with respect to the first, fixed driver limb 10*a*, and is therefore movable, in particular in the Y-direction. A latching element 27 is molded onto the second driver limb 10*b* (also called movable or bending limb in the following text), which latching element 27 protrudes into the receiving gap 21 (in the Y-direction). The latching element 27 is configured as a triangular latching hook, and has an entry bevel 28 which is inclined with respect to the gap bottom 23 of the receiving gap 21, and a normal (perpendicular) locking edge 29 with respect to the XZ-plane of the second (movable) driver limb 10*b* which is level with respect to the gap opening 22 of the receiving gap 2. The second (movable) driver limb (bending limb) 10*b* likewise has an entry bevel 30 in the region of the gap opening 22 of the receiving gap 21.

Via or by means of the limb-side entry bevels 26, 30 of the driver 10, the windowpane 4 can be inserted simply and without errors into its receiving gap 21. The windowpane 4 is inserted, with its pane lower edge at the front, via the gap opening 22 into the receiving gap 21 and between the two drivers 10*a* and 10*b* and is latched in the receiving gap 21. Here, the windowpane 4 slides with its pane lower edge along on the inclined entry bevel 28 of the latching element or hook 27. Here, the second, movable driver limb 10*b* of the driver 10 is bent open elastically in the Y-direction, and the latching element 27 snaps, grips or latches, in particular in a positively locking manner, into a latching opening 31 (denoted in FIGS. 6A and 6B) of the windowpane 4. In the snap-action or latching connection of the windowpane 4 to the driver 10, the latching element 27 or its locking edge 29 reaches as completely as possible through the pane-side latching opening 31.

The driver 10 has a locking function which is provided (realized), in particular, by way of locking or contact contours. This locking function prevents a deflection of the driver limb 10*b* which has the latching element 27 as a consequence of a compressive force F (FIGS. 6A, 6B) in the Y-direction on the latching element 27, in particular in the case of dismantling of the windowpane 4, beyond a permissible amount. As a result, a deflection of the second driver limb 10*b* beyond the amount is blocked or locked, and a fracture of the second driver limb 10*b* is prevented reliably.

To this end, the driver 10 has a locking element 32, 33 for limiting a pivoting path W (illustrated in FIG. 4) of the second driver limb 10*b* during its movement with respect to the first driver limb 10*a*. The locking element 32, 33 is arranged behind the latching element or hook 27 in the gap longitudinal direction Rz which is directed with respect to the gap bottom 23 of the receiving gap 21. In the exemplary embodiment, the locking element 32, 33 is arranged in the gap longitudinal direction Rz outside the receiving gap 21 in the region of the connecting limb 10*c* of the two driver limbs 10*a*, 10*b*, and is preferably arranged there in the connecting portion 10*d* of the connecting limb 10*d*. The locking element 32, 33 is configured as locking or contact contours which are elevated transversely with respect to the gap longitudinal direction Rz, that is to say in the gap transverse direction Rx or in the X-direction.

Figure 5:
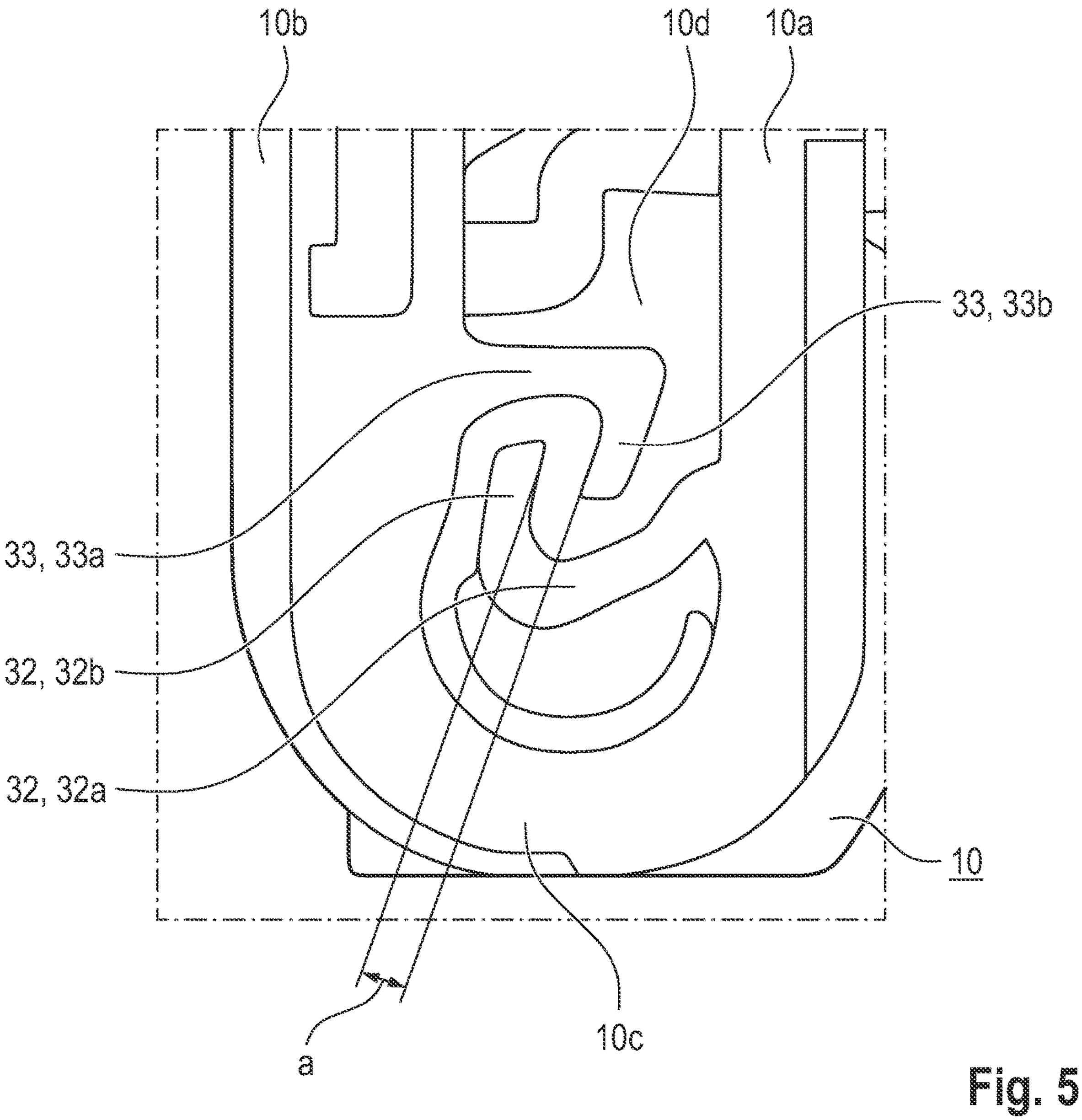
FIG. 5 is an enlarged view of detail V shown in FIG. 4 with a view of the locking element.

In the exemplary embodiment of FIGS. 4 and 5, two hooks 32 and 33 which are opposed and/or overlap one another and/or engage into one another are provided as locking element to this end. In other words, the locking element is formed from a first hook 32 as contact contour which is connected rigidly to the first driver limb 10*a* and is provided in the region of the connecting portion 10*d*, and a second hook 33 as second contact contour which is also driven in the case of a movement of the (movable or resiliently flexible) second driver limb 10*b* with respect to the first driver limb 10*a*. After passing through the pivoting path W, the second hook 33 comes into contact with the first hook 32. The locking element serves for dismantling limitation in the case of dismantling of the windowpane 4 from the driver 10 but can also serve as bending or movement limitation in the case of the insertion and latching of the windowpane 4 into or to the driver 10.

As illustrated in FIG. 5, the hooks 32, 33 have a holding limb 32*a*, 33*a* and a locking limb 32*b*, 33*b* which runs at an angle, for example approximately at a right angle, with respect thereto. The hook 32, 33 engages with its locking limb 32*b*, 33*b* over the locking limb 33*b*, 32*b* of the respective other hook 33, 32. The first hook 32 is arranged at a hook or contour spacing a from the second hook 33, which hook or contour spacing a decreases with an increasing movement of the second driver limb 10*b* and the latching element 27 along the pivoting path W. Here, the hook 33 which is assigned to the second driver limb 10*b*, in particular is molded onto the latter, or its locking limb 33*b* moves, as a consequence of a movement of the second driver limb 10*b* which has the latching element 27 with respect to the first driver limb 10*a*, along the pivoting path W toward the hook 32 which, as it were, is stationary, in particular is molded onto the first driver limb 10*a*, or its locking limb 32*b*, and comes into contact with the latter after passing through the spacing a.

Figure 6A:
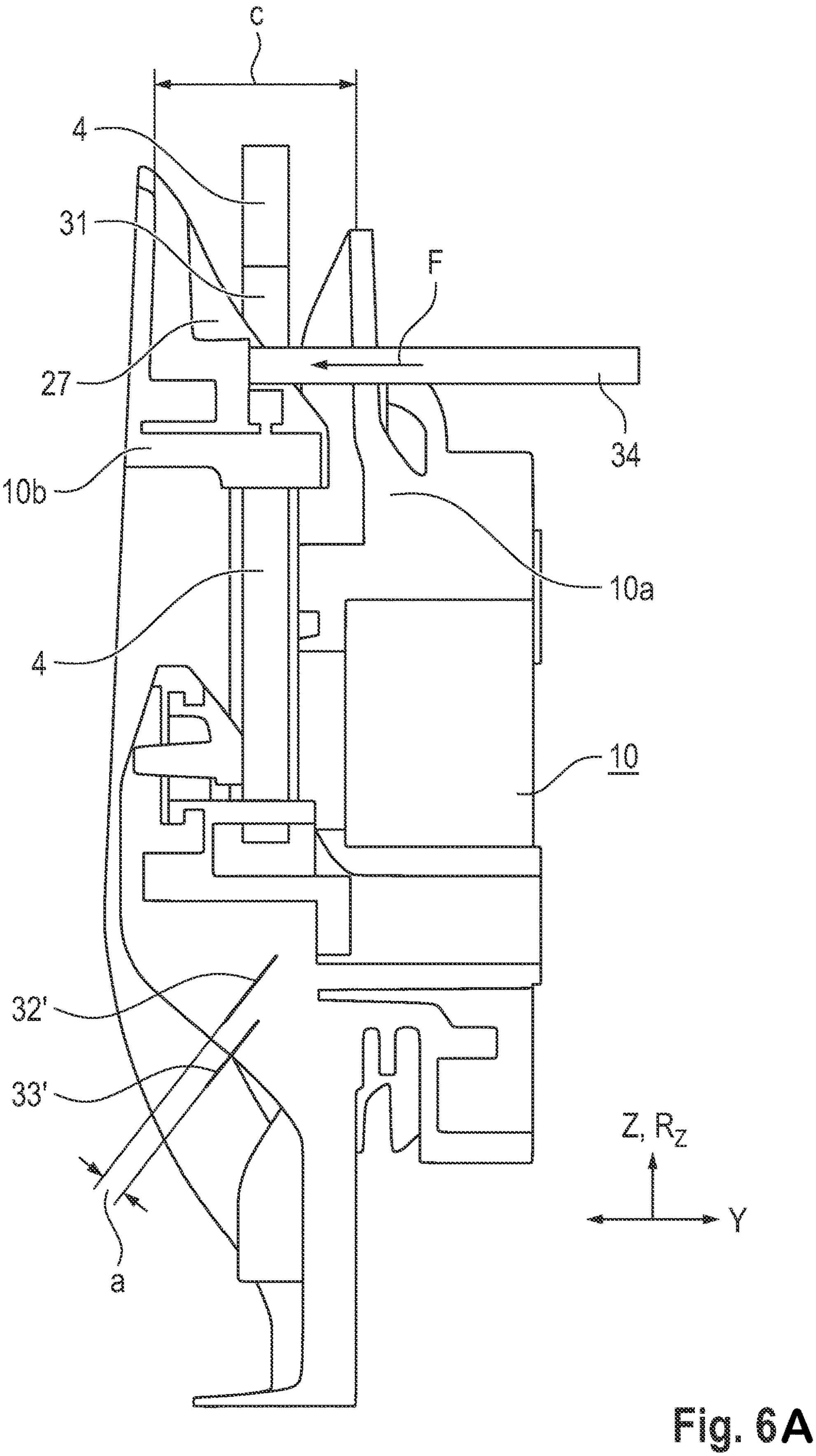
FIGS. 6A and 6B are side views according to FIG. 4 of the driver with one variant of the locking element and with a windowpane which is seated in the receiving gap between the driver limbs in a latched state and in a dismantled state.
Figure 6B:
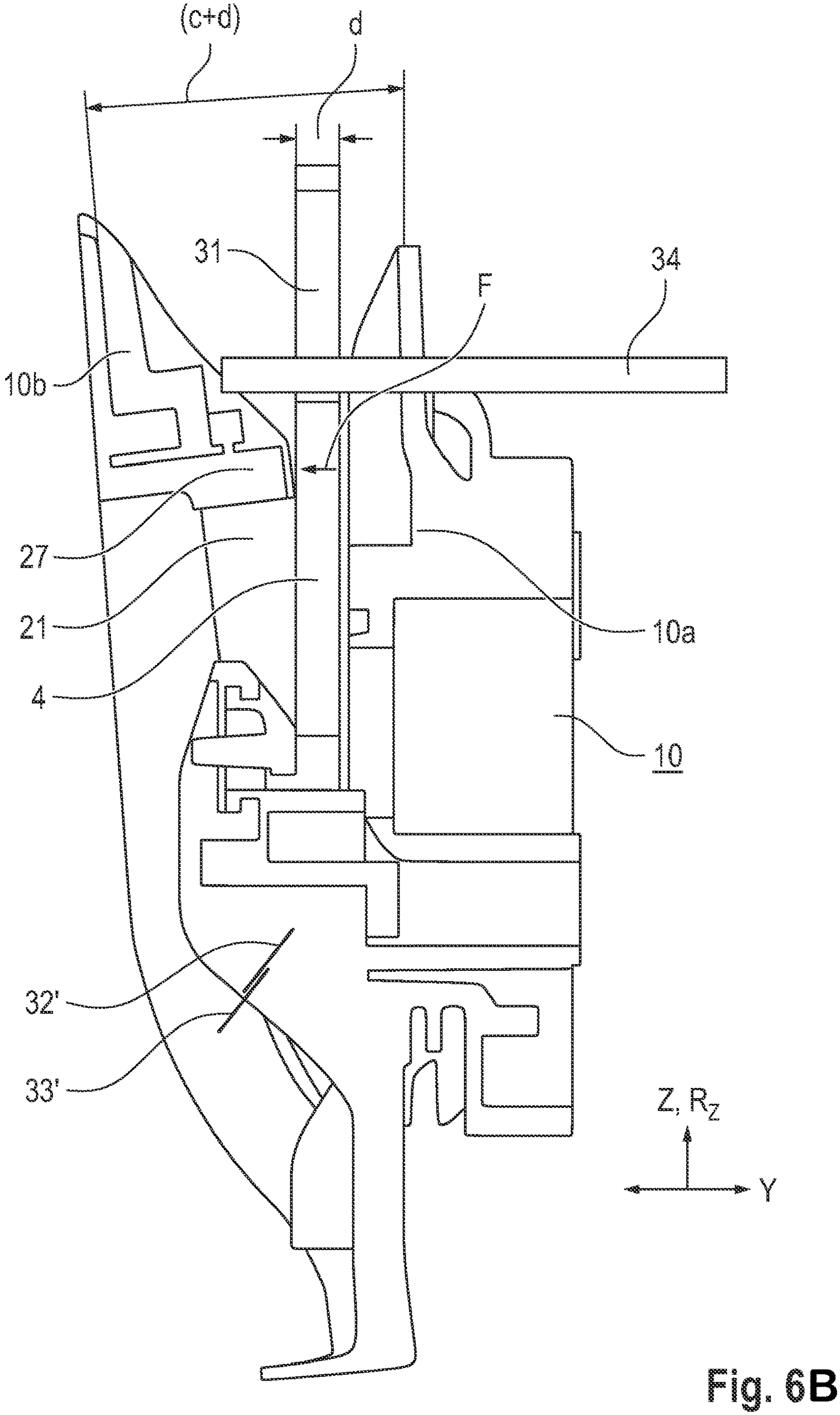

FIGS. 6A and 6B illustrate how, as a consequence of a compressive force F on the latching element 27 of the second, movable driver limb 10*b*, the spacing a becomes increasingly smaller with an increasing movement of the latching element 27 in the Y-direction. In the case of this exemplary embodiment, contours 32', 33' which run obliquely and, in particular, parallel to one another are provided as locking element, the spacing a of which likewise corresponds (as in the exemplary embodiment of FIGS. 4 and 5) approximately to the pane thickness of the windowpane 4.

A (dismantling) tool 34 which acts with a compressive force F on the latching element 27 of the second driver limb 10*b* is illustrated, which tool 34 is guided against the latching element 27 in a way which is not shown in greater detail via an opening in a body or vehicle door part. In FIG. 6B, the tool 34 reaches through the pane-side latching opening 31, and the windowpane 4 is already pulled a little out of the receiving gap 21 of the driver 10. In this position, the latching element 27 already bears against the vehicle pane 4, with the result that the tool 34 can be removed.

Here, as can be seen, the spacing a between the contours 32' and 33' of the locking element has been passed through completely, and the contours 32' and 33' bear against one another. Here, the limb spacing c between the driver limbs 10*a* and 10*b* in the region of the gap opening 22 of the driver 10 is increased by the pane thickness d of the windowpane 4, with the result that the vehicle pane 4 can be removed or dismantled completely from or out of the driver 10.

As can be seen from a comparison of FIGS. 6A and 6B, after this predefined spacing a is passed through as a consequence of a pivoting movement of the second driver limb 10*b* in the Y-direction along the pivoting path W between the limb-side contours 32, 33, a further deflection of the second driver limb 10*b* which has the latching element 27 is blocked in the Y-direction.

In summary, the invention relates to a window regulator assembly 2 for an adjustable windowpane 4 of a motor vehicle, having a driver 10 with a first driver limb 10*a*, and with a second driver limb 10*b* which can be moved in a (resiliently) flexible manner with respect to the former, and with a latching element 27 which protrudes into a receiving gap 21 between the driver limbs 10*a*, 10*b* and engages into a pane-side latching opening 31 during the insertion of the windowpane 4 into the receiving gap 21 of the driver 10, the driver 10 having a locking function which locks or blocks a deflection or movement of the second driver limb 10*b* beyond a permissible amount and/or if a predefined or predefinable pivoting path W is reached and/or after passing through a predefined or predefinable spacing a between limb-side contours 32, 33 or 32*b*, 33*b*.

To this end, the driver 10 preferably has a contact contour 32, on which the second driver limb 10*b* is supported as a consequence of a compressive force F which acts on the latching element 27 via the windowpane 4 in its closing direction or closed position S, in particular for dismantling purposes of the windowpane 4 which is latched or snapped into the driver 10. To this end, a locking contour 33 is further preferably provided on the second driver limb 10*b*, which locking contour 33 is spaced apart from the contact contour 32, in particular in the Y-direction. A reliable bending limitation of the (movable or resiliently flexible) second driver limb 10*b*, preferably to approximately the pane thickness of the windowpane 4, is achieved by means of the locking element 32, 33 or 32', 33' which is formed, in particular, from the contours.

The invention is not restricted to the above-described exemplary embodiments. Rather, other variants of the invention can also be derived herefrom by a person skilled in the art, without departing from the subject matter of the invention. In particular, furthermore, all individual features which are described in conjunction with the exemplary embodiment can also be combined with one another in a different way, without departing from the subject matter of the invention. For instance, the locking element can also be configured as a hinge, as an expansion element, as a hard stop, or as a combination of the mentioned and/or described geometries.

The following is a summary list of reference numerals and the corresponding structure used in the above description of the invention:

2 Window regulator assembly
4 Windowpane
6 Adjusting drive
8 Actuating mechanism
10 Driver
10*a* First (fixed) driver limb
10*b* Second (movable) driver limb
10*c* Connecting limb
10*d* Connecting/functional portion
12 Pull cable
14 Guide rail
16 Worm/spur gear mechanism
18 Cable drum
20 Deflection element/roller
21 Receiving gap
22 Gap opening
23 Gap bottom
24 Rail wrap-around means
25 Sliding piece
26 Entry bevel
27 Latching element/hook
28 Entry bevel
29 Locking edge
30 Entry bevel
31 (Pane-shaped) latching opening
32 Locking element/first hook
32*a* Holding limb
33*b* Locking limb
33 Locking element/second hook
33*a* Holding limb
33*b* Locking limb
34 Dismantling means/tool
a Contour/hook spacing
c Limb spacing
d Pane thickness
F (Tensile) force
S Closed position
O Open position
Rx Gap transverse direction
Rz Gap longitudinal direction
V Adjusting path
W Pivoting path
X,Y,Z Direction (in the vehicle coordinate system)

The invention claimed is:

1. A window regulator assembly for an adjustable windowpane of a motor vehicle, the window regulator assembly comprising:
- a guide rail;
- a driver having a connecting limb and two driver limbs connected via said connecting limb and between said two driver limbs a receiving gap for receiving the adjustable windowpane is formed, said two driver limbs including a first driver limb and a second driver limb being movable elastically with respect to said first driver limb, said first driver limb configured for guiding said driver along an adjusting path or for holding on said guide rail, said second driver limb having a latching element protruding into said receiving gap and engaging into a pane-side latching opening of the adjustable windowpane during insertion of the adjustable windowpane into said receiving gap of said driver, and said latching element being moved out of the pane-side latching opening for dismantling of the adjustable windowpane;
- said driver having a locking element for limiting a pivoting path of said second driver limb during movement of said second driver limb with respect to said first driver limb; and
- said locking element formed with a first contact contour and a second contact contour;
- said first contact contour being disposed:
  - on said first driver limb, or
  - in a region of said connecting limb for said two driver limbs, or
  - in a connecting portion of said connecting limb; and
- said second contact contour also moving when there is movement of said second driver limb with respect to said first driver limb, said second contact contour bearing against said first contact contour after passing through the pivoting path.

2. The window regulator assembly according to claim 1, wherein said locking element is disposed behind said latching element in a gap longitudinal direction which is directed with respect to a gap bottom of said receiving gap.

3. The window regulator assembly according to claim 2, wherein said locking element is:
- disposed outside said receiving gap in the gap longitudinal direction in a region of said connecting limb for said two driver limbs, or
- molded onto said two driver limbs, or
- configured as a locking contour or a contact contour that is elevated transversely with respect to the gap longitudinal direction.

4. The window regulator assembly according to claim 3, wherein said locking element is disposed outside said receiving gap in the gap longitudinal direction in a connecting section of said connecting limb for said two driver limbs.

5. The window regulator assembly according to claim 2, wherein said locking element is formed from hooks which:
- are opposed to one another; or
- overlap one another; or
- engage into one another.

6. The window regulator assembly according to claim 5, wherein:
- said hooks include:
  - a first hook connected to said second driver limb; and
  - a second hook connected to one of:
    - said first driver limb, or
    - said connecting limb, or
    - a connecting portion of said connecting limb between said two driver limbs.

7. The window regulator assembly according to claim 6, wherein:

said first hook is molded onto said second driver limb; and said second hook is molded onto one of:

said first driver limb, or said connecting limb, or said connecting portion between said two driver limbs.

8. The window regulator assembly according to claim 6 wherein said first hook is disposed at a spacing from said second hook, said spacing decreases with an increasing movement of said second driver limb and said latching element along the pivoting path.

9. The window regulator assembly according to claim 6, wherein:

said first hook faces said second driver limb, and said second hook faces said first driver limb; and/or said first and second hooks are disposed at a spacing in such a way with respect to one another that said second hook bears against said first hook after passing through said spacing as a consequence of a movement of said second driver limb, having said latching element, with respect to said first driver limb.

10. The window regulator assembly according to claim 9, wherein said spacing corresponds to a pane thickness of the adjustable windowpane.

11. The window regulator assembly according to claim 1, wherein said connecting limb between said two driver limbs is of tapered configuration with respect to at least said second driver limb in a connecting portion as a functional region which adjoins a gap bottom of said receiving gap and has said locking element.

12. The window regulator assembly according to claim 1, wherein:

said latching element has an entry bevel which is inclined with respect to a gap bottom of said receiving gap; or said latching element has a locking edge which is level with respect to a gap opening of said receiving gap and with which, in said latching element's connection to the adjustable windowpane, said latching element engages through the pane-side latching opening of the adjustable windowpane; or said first driver limb has a rail wrap-around means for said guide rail.

* * * * *